United States Patent [19]
Costello

[11] 3,728,566
[45] Apr. 17, 1973

[54] SALIENT POLE ROTOR CONSTRUCTION WITH REMOVABLE POLE TIPS

[75] Inventor: Charles Albert Costello, Erie, Pa.

[73] Assignee: General Electric Company

[22] Filed: Oct. 4, 1971

[21] Appl. No.: 186,349

[52] U.S. Cl. .................................. 310/194, 310/269
[51] Int. Cl. ............................................. H02k 1/24
[58] Field of Search ..................... 310/180, 184, 185, 310/194, 218, 269

[56] References Cited

UNITED STATES PATENTS

| | | | |
|---|---|---|---|
| 853,285 | 5/1907 | Waters | 310/218 |
| 2,736,829 | 2/1956 | Sills | 310/269 X |
| 3,339,097 | 8/1967 | Dunn | 310/269 X |
| 1,279,643 | 9/1918 | Brown | 310/194 |
| 571,462 | 11/1896 | Thomson et al. | 310/194 X |

Primary Examiner—D. F. Duggan
Attorney—I. David Blumenfeld et al.

[57] ABSTRACT

A salient pole rotor construction which has removable pole tips to facilitate assembly and disassembly of the rotor. The removable pole tip is so constructed that centrifugal forces produced during rotation act to seat the pole tip more firmly to the rotor pole. The rotor pole bodies have an arcuate pole tip retaining slot extending along the length of the pole body. The removable pole tip consists of the pole tip portion having a surface which mates with that of the pole surface and an arcuate retaining stem which has the same curvature as the retaining slot in the pole shoe. The rotor is assembled by positioning a pre-formed field coil over the rotor core and then attaching the salient pole tips by inserting the arcuate stem in the retaining slot to lock the coil in place and retain it in position. By virtue of the arcuate configuration, the centrifugal forces generated by rotation force the arcuate stem of the pole tips firmly against the side of the slots thereby utilizing the centrifugal force to seat the salient pole tips firmly. By virtue of this construction, pre-formed field coils may be used simplifying the assembly of the rotor. Assembly time is reduced, while at the same time, scrap and rework losses are cut down producing highly desirable cost savings.

7 Claims, 5 Drawing Figures

PATENTED APR 17 1973

SALIENT POLE ROTOR CONSTRUCTION WITH REMOVABLE POLE TIPS

This invention relates to a dynamoelectric machine and more particularly, to a dynamoelectric machine having a salient pole rotor with removable pole tips and a method for assembling the same.

In fabricating rotors for high speed dynamoelectric machines, such as A.C. alternators or the like, one well known configuration involves a rotor having one or more pairs of projecting poles with overhanging or salient pole tips. These salient pole tips overhang the pole body to secure the field coil in place against the action of centrifugal force when the rotor is in motion. The assembly of a rotor with a salient pole configuration is a difficult manufacturing problem. With the pole tips integral with the rotor pole body, each individual turn of the coil has to be slipped over the pole tip a turn at a time, layer by layer. With the coil assembled on a turn by turn, layer by layer basis, it is necessary to tamp each of the coil turns and layers down into the final configuration in order to compact the coil into its final shape. Not only is this procedure time consuming and costly, but the compacting or tamping down of the coil layers can result in damage to the insulating slot linear and the coil insulation. Such damage can result in grounding the coil to the rotor iron causing the machine to malfunction. Thus, these prior art structures and fabrication processes are complex and costly since the labor involved in winding the field coils on a turn by turn basis is obviously substantial. Furthermore, the reproducibility of the field coil characteristics is more difficult to maintain where hand winding is involved. The attendant scrap and rework losses add to the cost of machines assembled in this manner.

In an attempt to avoid some of these difficulties, one class of prior art salient pole rotor machines contemplated making the entire pole shoe including the salient tips removable so that a pre-formed coil could be placed over the rotor pole body thereby simplifying the assembly of the device. Typical of this class of machines is the rotor illustrated in U.S. Pat. No. 2,655,613, Wieseman issued Oct. 13, 1953 in which the entire pole shoe is bolted to the pole body after the pre-formed coil is placed on the pole body. While this avoided one set of problems by reducing the labor costs in assembling the field coils and permitting the use of pre-formed coils, the advantages thus realized were materially reduced because this type of construction had severe mechanical weaknesses. That is, bolting of the pole shoe to the rotor body seriously weakened the pole structure especially at high speeds and under large centrifugal forces. Thus, making the entire pole shoe removable and bolting it to the rotor pole body had serious shortcomings because it affected the structural integrity of the rotor under the stresses induced by large centrifugal forces.

Another prior art salient pole construction avoided the use of a bolted pole shoe and instead used a removable pole shoe which had a dovetail stem which mated with a corresponding keyway in the pole body. The rotor was assembled by inserting the dovetailed stem endwise into the corresponding keyway in the pole body. This type of rotor construction is illustrated in U.S. Pat. No. 2,736,829 — Sills, issued Feb. 28, 1956 and U.S. Pat. No. 3,089,049, Sills, issued May 7, 1963. These dovetail-keyway constructions are, however, complex and the material and labor costs are high. Even with the most simple of the dovetail-keyway constructions, the assembly is also complex because of the need to assemble the device by inserting the dovetail endwise with at least a portion thereof lying below the top of the coil. Consequently, while these constructions had many advantages over the integral assemblies which involved winding each turn of the coil individually, and over removable pole shoe arrangements which were bolted to the rotor body, they too, had shortcomings in terms of the complexity of the device, and the cost and assembly time necessary to fabricate the rotor. Furthermore, though the initial assembly was simplified with these constructions since a preformed coil can be used and placed directly over the rotor body, disassembly of the device for repair or the like, is extremely difficult once the rotor has been assembled.

A need therefore, exists for a salient pole rotor construction in which only the pole tip itself is removable in order to facilitate ease of assembly of the device, while in a true sense, permitting disassembly of the rotors simply and effectively for repair or maintenance of the device. Furthermore, such a structure should be characterized by a fastening arrangement in which the pole tips are attached to the pole body in such a manner that the structural integrity of the device is maintained even at high speeds, while at the same time, firmly securing the pole tips in place during rotation.

It is therefore, a primary objective of the instant invention to provide a dynamoelectric machine having a salient pole rotor construction with removable pole tips.

A further objective of the invention is to provide a salient pole rotor construction with removable pole tips to facilitate assembly and disassembly of the rotor.

Yet another objective of the invention is to provide a salient pole rotor construction with removable pole tips wherein centrifugal forces produced during the rotation act on the pole tips to seat them firmly in place.

A still further objective of the invention is to provide a salient pole rotor construction with removable pole tips which may be assembled utilizing pre-formed coils.

Still another objective of the invention is to provide a process for fabricating a salient pole rotor machine through the use of removable pole tips and pre-formed coils to minimize labor and material costs.

Still other objectives and advantages of the invention will become apparent as the description thereof proceeds.

The various advantages of the invention are realized in a salient pole rotor construction having removable pole tips. The removable tips have an arcuate retaining stem which mates with an arcuate retaining slot extending along the length of the rotor pole body. The pole tip is fastened to the rotor pole by rolling the arcuate stem into the slot from the top thereby avoiding endwise insertion. By virtue of the arcuate stem and slot construction for retaining the pole tip, the pole tips may be securely fastened to the rotor without permanently securing the pole tip to the rotor thereby enhancing ease of disassembly for subsequent repair and replacement of the components. Furthermore, by virtue of this arcuate configuration of the pole tip retaining stem, the centrifugal forces produced during the rotation are utilized positively to provide additional locking action for the pole tip. That is, the centrifugal forces tend to rotate the arcuate stem portion in a direction to seat them firmly against the side of the retaining slot thereby insuring that the pole tips are seated firmly. By virtue of this arrangement, ease of assembly with a minimum of labor is insured since preformed coils may be utilized and placed directly over the rotor pole body and the pole tips assembled thereafter.

The novel features which are believed to be characteristic of this invention are set forth with particularity in the appended claims.

The invention itself however, both as to its organization and method of operation, together with further objectives and advantages thereof, may be best understood by reference to the following description taken in connection with the accompanying drawings in which.

Figure 1:
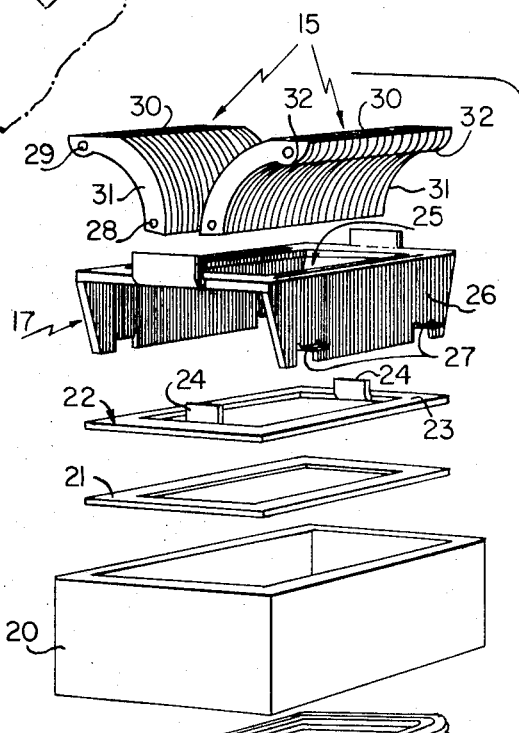
FIG. 1 is a partially exploded fragmentary perspective of a multi-pole salient tip rotor.
Figure 3:
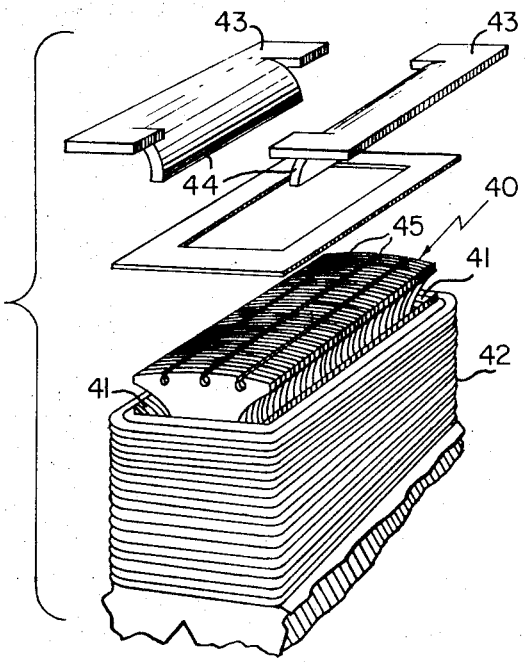
FIG. 3 is a fragmentary partially exploded perspective view of an alternative embodiment of the removable pole tip construction of the instant invention.

The novel salient pole machine of the instant invention is illustrated in FIG. 1 is which part of a multi-pole rotor 10 constructed in accordance with the invention is shown. Each of the salient poles 11 consists of a pole body 13 extending from a hub 14. Pre-formed field coils 16 are positioned over non-magnetic pole tip and winding retainers 17 are positioned between the field coils and removable pole tips 15. Rotor pole bodies 13 are of a laminated construction to minimize losses due to circulating or eddy currents and suitable amortisseur bars 18 are provided along the upper pole face. Two arcuate pole tip retaining slots 19 for receiving the removable pole tips 15 are provided on either side of each rotor pole.

A pre-formed insulated field coil 16 is placed over the pole body. An insulating liner 20 is positioned over coil 16 and provides suitable insulation between coil 16 and the metallic, non-magnetic pole tip and winding retainer 17. Slot liner 20 may be fabricated of any suitable insulating material such as the polyamide sheets sold under the trademark "Nomex." Alternatively, a polyester film such as the one sold by the Dupont Company under its trade designation Mylar, may also be utilized to form liner 20. An insulating washer 21 is placed over insulating liner 20 and filed coils 16. An amortisseur winding 22 shown in the form of a thin rectangular sheet of copper having a central aperture 23 is positioned underneath the pole tip retainer. Retaining tabs 24 extend upward from the amortisseur winding and fit into aperture 25 in pole tip retainer 17 to lock the amortisseur winding against axial movement. Pole 13 fits snugly in aperture 25 of retainer 17 while side walls 26 fit over the field coil and insulating liner to retain the coil firmly in place. A pair of locking tabs 27 extend from each side of the retainer side walls and abut against corresponding tabs in the retainer of the adjacent rotor pole to lock the members rigidly against movement and act as a restraining member.

The removable pole tips shown generally at 15 consist of a plurality of lamination which are fastened together by means of rivets 28 and 29. The pole tips consist of a pole tip portion 30 which has an upper surface which mates with the surface of pole 13 and an arcuate retaining stem 31 which fits into retaining slots 19 to secure the pole tips in the rotor. A lip 32 on the underside of the pole tip fits into a pair of locking grooves 33 (seen most clearly in FIG. 2) extending along the side of retaining member 17. It will be apparent from the construction illustrated in FIGS. 1 and 2 that the pole tips are not permanently fastened to the rotor poles and may be easily removed while at the same time, being securely retained to the pole during rotation. In fact, the centrifugal forces generated during rotation of the multi-pole rotor act to seat the arcuate stem portion more firmly in retaining grooves 19 thus assuring a firm and positive seating of the pole tip during rotation.

The salient pole rotor assembly of the invention is fabricated by assembling the punchings having straight pole bodies and the arcuate grooves. The rotor is mounted on a shaft and fastened together in any suitable way as by keyways, bolts or the like. After the rotor is assembled, a pre-formed insulated coil is placed over pole body 13. Insulating liner 20, formed of Nomex, polyamide film, or the like, is then placed over the preformed coil. The insulating washer 21 and the amortisseur winding 22 are placed on top of the coil and insulator lining. A non-magnetic pole tip and winding retainer 17 which is preferably fabricated of a non-magnetic conducting material such as aluminum, for example, is then placed over the coil, liner, amortisseur winding, etc. with tabs 24 of the amortisseur winding passing through aperture 25 of retaining member 17. The arcuate pole tip retaining stem members 31 is passed through aperture 25 in pole tip retaining member 17 and into arcuate slots 19 in the body of the rotor pole. Since the radii of the slots and the pole tip or stems are the same, the stem is easily rotated or rolled into the slots and the pole tips are pushed until the lips 32 on the underside of the pole tip rest securely in locking grooves 33 in the pole tip retainer. Locking tabs 27 extending from retainer 17 abut the tabs in the retainer mounted on the adjacent pole producing a rigid structure in which the coils are firmly held in place and in which the pole tips may be readily removed and the rotor disassembled for repair or replacement of coils or the like. It will be apparent from the description of the rotor construction and the manner of assembly, that a very simple, yet effective rotor construction assembly has been provided which is easy to assemble and disassemble and which is structurally sound and capable of operating under high rotational speeds.

Figure 2:
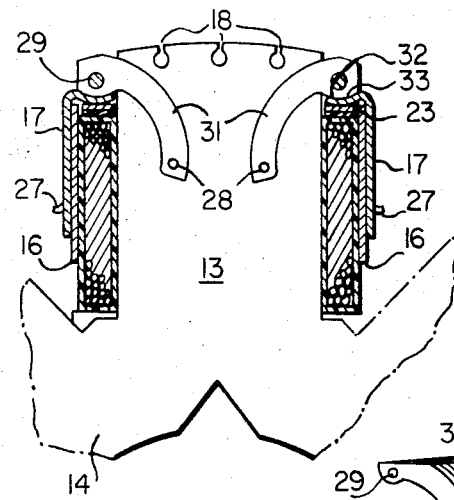
FIG. 2 is a sectional view of the salient pole machine with removable pole tips taken along the line 2—2 of FIG. 1.

In the salient pole rotor construction illustrated in FIGS. 1 and 2, the removable pole tips with the arcuate stem was of a laminated construction and also incorporated a pole tip and winding retainer to insure that the field coils were securely retained to the rotor pole. The alternate embodiment illustrated in FIG. 3–6 shows a removable pole tip construction of the type illustrated in FIGS. 1 and 2, but in which the removable pole tip is of solid construction and completely surrounds the rotor pole so that the removable pole tip completely surrounds the coil and the need for a coil and pole retaining member 17 is eliminated. Thus, in FIG. 3, a laminated rotor pole core 40 is shown formed of a plurality of laminations or punchings having arcuate pole retaining slots 41 for receiving the arcuate pole tip stems and a pre-formed coil 42 mounted over the rotor poles. The removable pole tips are shown as a pair of solid pole tips 43 having a generally U-shaped configuration and arcuate retaining stems 44. A plurality of amortisseur bars extend axially along the upper surface of the rotor pole and the pole tips are, in a manner similar to that described in FIGS. 1 and 2, inserted into slots 41.

Figure 4:
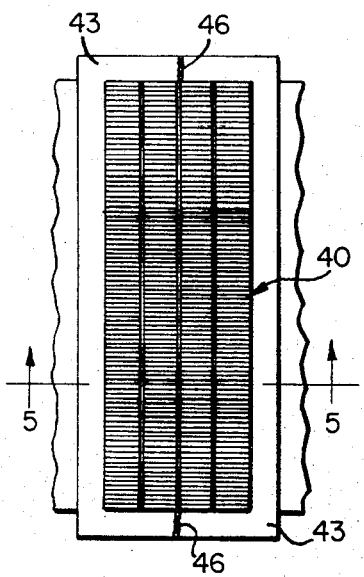
FIG. 4 is a plan view of the rotor pole of FIG. 3.
Figure 5:
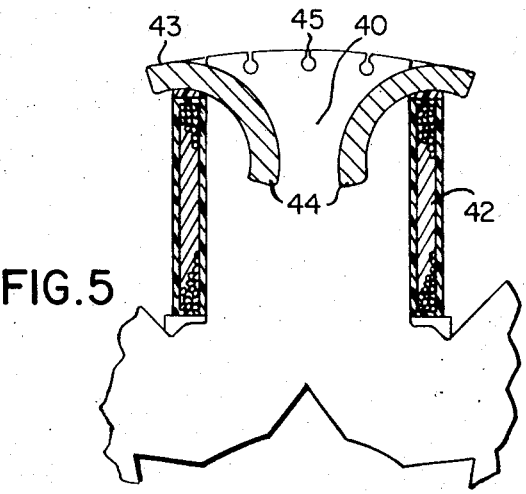
FIG. 5 is a sectional view taken along lines 5—5 of FIG. 4.

The assembled rotor pole may be seen most clearly in FIG. 4 in which the two U-shaped pole tip portions are shown as physically joined at their junctures by means of a weld 46 or the like to produce the rectangular pole tip configuration having an aperture into which the rotor pole body 40 snugly fits. As shown in FIG. 5, with arcuate retaining stems 44 positioned in rotor slots 41, the pole tip 43 extends over and retains winding 42 and maintains it firmly in position during the rotation. It will also be seen that the centrifugal forces producing a rotational outward force on the pole tips and the pole tip stems tend to rotate the retaining stem against the arcuate surface of the retaining slot thereby producing a firm seating of the pole tips against the arcuate slot surfaces. Thus, by virtue of this configuration of the pole tips and the pole tip retaining stems, the centrifugal forces generated during rotation are put effectively to use to insure an even firmer seating of the pole tips providing a rigid unitary structure even though the pole tips are removable, while at the same time, maintaining the structural integrity of the rotor pole since bolts or the like are not utilized for fastening purposes.

It will be apparent from the above discussion that a simple, highly effective salient pole construction has been provided in which the rotor pole tips may be removed to facilitate assembly by the use of pre-formed coils. At the same time, the structure for achieving this desirable result is extremely simple in nature thereby simplifying the assembly procedures even further, the construction does not involve any fastening means which would in any way concentrate stresses on the rotor pole during rotation thereby avoiding impairing the structural integrity of the rotor, while at the same time, providing a highly effective unitary structure in which the centrifugal forces generate during rotation made in maintaining the mobile pole tips firmly in place. And as a final and by no means unimportant advantage, the pole tips may be easily removed after initial assembly to remove insulation slot winders, coils, or the like for ready repair and maintainability of the device. Thus, effective, economically desirable salient pole rotor structure with removable pole tips has been provided. While particular embodiments of this invention have been shown and described above, it will, of course, by understood that the invention is not limited thereto since many other modifications in the structures and components implied may be made. It is contemplated by the appended claims to cover any such modifications which fall within the true spirit and scope of this invention.

What is claimed as new and desired to be secured by Letters Patent of the U.S. is:

1. In a dynamoelectric machine the combination of;
   a. a laminated rotor having a plurality of pole bodies
   b. a pre-formed winding mounted about each pole body,
   c. removable salient pole tips for each of said pole bodies extending over said windings, said removable pole tips including,
      1. a pole tip portion having an upper surface which mates with the top surface of the pole body to form a salient pole construction,
      2. an arcuate retaining stem for securing the pole tips to the pole body,
   d. means for securing the removable pole tips to the pole body including arcuate retaining slot means in the pole body for receiving the arcuate pole tip retaining stem.

2. The dynamoelectric machine with a salient pole rotor as defined in claim 1 wherein the said retaining slot means includes arcuate slots extending on opposite sides of each le along the entire length thereof.

3. The dynamoelectric machine with a salient pole rotor as defined in claim 1 including a non-magnetic coil retainer positioned between the removable pole tips and the pre-formed coils, said coil retainer having an aperture to receive the pole body, and side walls extending downwardly over a portion of the coils.

4. The dynamo electric machine with a salient pole rotor as defined in claim 3 wherein said coil retainer includes at least one locking groove on the upper surface to receive the under side of said pole tip portion.

5. The dynamoelectric machine with a salient pole rotor as defined in claim 4 in which said pole tip portion has a lip on the under side thereof which is retained in said locking groove.

6. The dynamoelectric machine with a salient pole rotor as defined in claim 1 in which each removable pole tip includes a U-shaped pole tip portion and an arcuate retaining stem extending downward from the U-shaped portion.

7. The dynamoelectric machine with a salient pole rotor as defined in claim 6 wherein each pole includes two such pole tips secured together to form a pole tip having an aperture to receive said pole.

* * * * *